United States Patent
Kaneko et al.

(10) Patent No.: US 12,061,092 B2
(45) Date of Patent: Aug. 13, 2024

(54) VEHICLE CONTROLLER AND VEHICLE CONTROL SYSTEM

(71) Applicant: TOYOTA JIDOSHA KABUSHIKI KAISHA, Aichi-ken (JP)

(72) Inventors: Tomohiro Kaneko, Mishima (JP); Daiki Yokoyama, Gotemba (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 102 days.

(21) Appl. No.: 17/892,124

(22) Filed: Aug. 22, 2022

(65) Prior Publication Data

US 2023/0069594 A1 Mar. 2, 2023

(30) Foreign Application Priority Data

Aug. 25, 2021 (JP) ................................. 2021-136913

(51) Int. Cl.
*G01C 21/34* (2006.01)
*B60L 53/10* (2019.01)
(Continued)

(52) U.S. Cl.
CPC .......... *G01C 21/3469* (2013.01); *B60L 53/11* (2019.02); *B60L 53/124* (2019.02);
(Continued)

(58) Field of Classification Search
CPC . G01C 21/3469; G01C 21/3691; B60L 53/11; B60L 53/124; B60L 53/126; B60L 53/14; B60L 53/32; B60L 53/65; B60L 58/13; B60L 2240/622; B60L 2240/66; B60L 2240/80; B60L 2250/16;
(Continued)

(56) References Cited

U.S. PATENT DOCUMENTS

2010/0138142 A1* 6/2010 Pease ................ B60W 50/0097
701/123
2011/0071932 A1* 3/2011 Agassi ................... B60L 53/80
320/109

(Continued)

FOREIGN PATENT DOCUMENTS

JP 2011-153892 A 8/2011
JP 2016140193 A 8/2016
WO 2020/188737 A1 9/2020

*Primary Examiner* — Phutthiwat Wongwian
*Assistant Examiner* — Susan E Scharpf
(74) *Attorney, Agent, or Firm* — HAUPTMAN HAM, LLP (57) ABSTRACT

A vehicle controller includes a processing unit which creates a power-supply plan that ensures a first amount of electric power needed for the vehicle to arrive at the destination from the current location along a travel route. The travel route includes a specified section on which wireless power-supply equipment, among a plurality of power-supply equipment, is disposed. Using weather information including the specified section, the processing unit creates the power-supply plan in which a ratio of a second amount of electric power, which is supplied from the at least one wireless power-supply equipment to the vehicle, to the first amount of electric power is less in a first case in which deposition is determined to be present on the specified section than in a second case in which deposition is determined to be not present on the at least one specified section.

8 Claims, 9 Drawing Sheets

(51) Int. Cl.
*B60L 53/124* (2019.01)
*B60L 53/126* (2019.01)
*B60L 53/14* (2019.01)
*B60L 53/30* (2019.01)
*B60L 53/65* (2019.01)
*B60L 58/13* (2019.01)
*G01C 21/36* (2006.01)

(52) U.S. Cl.
CPC ............ *B60L 53/126* (2019.02); *B60L 53/14* (2019.02); *B60L 53/32* (2019.02); *B60L 53/65* (2019.02); *B60L 58/13* (2019.02); *G01C 21/3691* (2013.01); *B60L 2240/622* (2013.01); *B60L 2240/66* (2013.01); *B60L 2240/80* (2013.01); *B60L 2250/16* (2013.01); *B60L 2260/52* (2013.01); *B60L 2260/54* (2013.01); *Y02T 10/70* (2013.01); *Y02T 10/7072* (2013.01)

(58) Field of Classification Search
CPC .. B60L 2260/52; B60L 2260/54; Y02T 10/70; Y02T 10/7072
See application file for complete search history.

(56) References Cited

U.S. PATENT DOCUMENTS

| | | | | |
|---|---|---|---|---|
| 2011/0225105 | A1* | 9/2011 | Scholer | G06Q 50/06 320/109 |
| 2012/0203726 | A1* | 8/2012 | Klabjan | G06Q 10/06 706/46 |
| 2012/0206098 | A1* | 8/2012 | Kim | B60L 53/39 320/108 |
| 2014/0340027 | A1* | 11/2014 | Keeling | B60L 53/36 320/108 |
| 2015/0015419 | A1* | 1/2015 | Halker | B60L 53/124 320/108 |
| 2015/0158397 | A1* | 6/2015 | Soto | B60L 15/2009 903/903 |
| 2019/0168631 | A1* | 6/2019 | Cho | B60L 53/14 |
| 2019/0308515 | A1* | 10/2019 | Gou | B60L 53/12 |
| 2021/0146785 | A1* | 5/2021 | Wang | G06N 20/00 |
| 2021/0180967 | A1* | 6/2021 | Chae | G01C 21/3469 |
| 2022/0026228 | A1* | 1/2022 | Kasioumis | G01C 21/28 |

* cited by examiner

VEHICLE CONTROLLER AND VEHICLE CONTROL SYSTEM

This nonprovisional application is based on Japanese Patent Application No. 2021-136913 filed on Aug. 25, 2021 with the Japan Patent Office, the entire content of which is hereby incorporated by reference.

BACKGROUND

Field

The present disclosure relates to a vehicle controller and a vehicle control system.

Description of the Background Art

Conventionally, a configuration is known creates a power-supply plan for a vehicle that is capable of charging in multiple manners. For example, Japanese Patent Laying-Open No. 2016-140193 discloses a vehicle battery charging information reporting system which reports the charge schedule for a vehicle, which is capable of charging by plug-in charging, wireless charging, and solar charging scheme, to the terminal device of the vehicle's user. According to the charging information reporting system, the information related to charging by multiple charge schemes, including the plug-in charging, can be appropriately reported to the vehicle's user, thereby enhancing the user convenience.

SUMMARY

If wireless power-supply equipment is disposed along the travel route of a vehicle, the vehicle that is traveling in close proximity to the power-supply equipment can be supplied with an electric power from the charging equipment. However, if deposition, originated from the weather (e.g., snow or Asian dust), is present on the travel route, an amount of electric power supplied from the wireless power-supply equipment to the vehicle during traveling (the power-supply volume) may decrease less than the power-supply volume expected by the power-supply plan, due to the weather of the geographical region including the travel route. If the vehicle follows a power-supply plan that fails to take into account the reduction of the power-supply volume by the wireless power-supply equipment due to the deposition, the amount of electric power that is needed for the vehicle to arrive at the destination from the current location may not be ensured. As a result, the amount of electric power stored in the vehicle may run short part way through the travel route from the current location to the destination, which may prevent the vehicle from arriving at the destination. Nevertheless, the charging information reporting system disclosed in PTL 1 fails to take into account the reduction of the power-supply volume by the wireless power-supply equipment due to deposition that can be present on the travel route.

Therefore, an object of the present disclosure is to prevent a vehicle traveling according to a power-supply plan from the power shortfall.

A vehicle controller according to the present disclosure is capable of being charged with an electric power supplied from outside a vehicle during traveling or parking. The vehicle controller includes a memory device and a processing unit. The memory device stores information regarding each of a plurality of power-supply equipment. The processing unit creates a travel route for the vehicle from the current location to the destination and a power-supply plan that ensures a first amount of electric power that is needed for the vehicle to arrive at the destination from the current location along the travel route. The information regarding each of the plurality of power-supply equipment includes location information of the power-supply equipment and information indicating whether the power-supply equipment is wired power-supply equipment or wireless power-supply equipment. The travel route includes at least one specified section in which at least one wireless power-supply equipment, among the plurality of power-supply equipment, is disposed. The at least one wireless power-supply equipment is capable of supplying an electric power to the vehicle during traveling on the at least one specified section. Using weather information including the at least one specified section, the processing unit creates the power-supply plan in which a ratio of a second amount of electric power, which is supplied from the at least one wireless power-supply equipment to the vehicle, to the first amount of electric power is less in a first case in which deposition is determined to be present on the at least one specified section than in a second case in which deposition is determined to be not present on the at least one specified section.

Since the vehicle controller creates the power-supply plan that takes into account the reduction of the second amount of electric power supplied from the wireless power-supply equipment due to the deposition present on the at least one specified section, the first amount of electric power can be ensured which is needed for the vehicle to arrive at the destination from the current location according to the power-supply plan. As a result, the vehicle that is traveling according to the power-supply plan can be prevented from the power shortfall.

The processing unit creates the power-supply plan in which the ratio of the second amount of electric power to the first amount of electric power is less when a great amount of deposition is present on the at least one specified section than when a less amount of deposition is present on the at least one specified section.

By changing the ratio of the second amount of electric power to the first amount of electric power in the power-supply plan in accordance with the amount of the deposition present on the at least one specified section, the first amount of electric power can be ensured according to the power-supply plan and a required amount of time from the current location to the destination, involved in the charging during parking, can be prevented from increasing.

The vehicle may include a power storage device. The plurality of power-supply equipment may include specified power-supply equipment disposed at the current location. The processing unit may create the power-supply plan in which a state of charge of the power storage device when the vehicle leaves the current location is increased higher in the first case than in the second case by charging the power storage device using the specified power-supply equipment.

By increasing the SOC of the power storage device when the vehicle leaves the current location, the vehicle can be prevented from the power shortfall before arriving at the destination, even if the power-supply volume by the wireless power-supply equipment in the at least one specified section is reduced due to the deposition.

The vehicle may include a display device. The processing unit may output route information for showing the travel route and the power-supply plan on the display device.

With such a configuration, the driver of the vehicle is allowed to know the actual travel route and power-supply plan by viewing the display device.

The processing unit may output route information for allowing the vehicle, capable of autonomous driving, to travel by the autonomous driving to the destination, according to the travel route.

With such a configuration, the vehicle can travel by the autonomous driving to the destination, according to the created travel route.

A vehicle control system according to the present disclosure includes a vehicle, a memory device, and a processing unit. The vehicle is capable of being charged with an electric power that is supplied from outside the vehicle during traveling or parking. The memory device stores information regarding the vehicle and information regarding each of a plurality of power-supply equipment. The processing unit creates a travel route for the vehicle from a current location to a destination, and a power-supply plan that ensures a first amount of electric power needed for the vehicle to arrive at the destination from the current location along the travel route. The information regarding each of the plurality of power-supply equipment includes location information of the power-supply equipment and information indicating whether the power-supply equipment is wired power-supply equipment or wireless power-supply equipment. The travel route includes at least one specified section in which at least one wireless power-supply equipment, among the plurality of power-supply equipment, is disposed. The at least one wireless power-supply equipment is capable of supplying an electric power to the vehicle during traveling on the at least one specified section. Using weather information including the at least one specified section, the processing unit creates the power-supply plan in which a ratio of a second amount of electric power, which is supplied from the at least one wireless power-supply equipment to the vehicle, to the first amount of electric power is less in a first case in which deposition is determined to be present on the at least one specified section than in a second case in which deposition is determined to be not present on the at least one specified section.

The vehicle may include a display device for showing the travel route and the power-supply plan created by the processing unit.

With such a configuration, the driver of the vehicle is allowed to know the actual travel route and power-supply plan by viewing the display device.

The vehicle may be capable of autonomous driving, and travels by the autonomous driving to the destination according to the travel route created by the processing unit.

With such a configuration, the vehicle can travel by the autonomous driving to the destination, according to the created travel route.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment according to the present disclosure will be described in detail, with reference to the accompanying drawings. Note that the same reference sign is used to refer to the same or like parts, and the description thereof will not be repeated.

Figure 1:
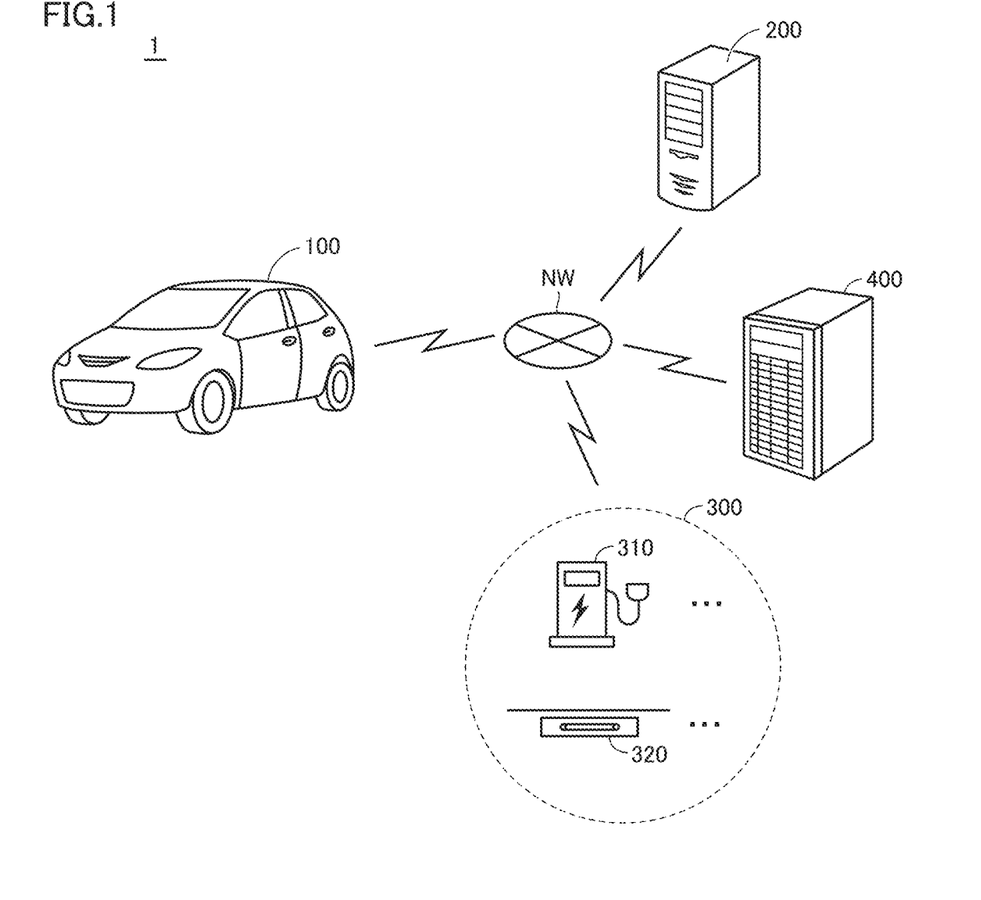
FIG. 1 is a diagram showing an overall configuration of a vehicle control system according to an embodiment of the present disclosure.

FIG. 1 is a diagram showing an overall configuration of a vehicle control system 1 according to an embodiment of the present disclosure. Referring to FIG. 1, the control system 1 includes a vehicle 100, a vehicle control server 200, a power-supply equipment group 300 including multiple power-supply equipment, and a weather information server 400 that broadcasts in real time the weather information (e.g., the snow information or the Asian dust information) of respective geographical regions. The vehicle 100, the vehicle control server 200, the power-supply equipment group 300, and the weather information server 400 are capable of communications with each other via a network NW such as the Internet. The vehicle control server 200 and the weather information server 400 may be integrally formed.

The vehicle 100 is an electric-powered vehicle having mounted thereon a power storage device (not shown) for the vehicle 100 to travel, which can be charged from the power-supply equipment group 300. The vehicle 100 is, for example, a battery electric vehicle (BEV), or a plug-in hybrid electric vehicle (PHEV), etc. The vehicle 100 can be charged with an electric power supplied external to the vehicle 100 during traveling or parking (external charging). In other words, the vehicle 100 is capable receiving an electric power from wireless power-supply equipment during traveling, and receiving an electric power from wireless power-supply equipment or wired power-supply equipment while stopped. Note that the vehicle 100 "during traveling" refers to the vehicle 100 being located on a road to travel, including not only the vehicle 100 being actually traveling, but also the vehicle 100 being temporarily stopped at a traffic light, etc. The vehicle 100 "during parking," in contrast, refers to the vehicle 100 being stopped in a particular location dedicated for the vehicle 100 to stop for a relatively long time.

The vehicle control server 200 has: information related to the vehicle 100 (e.g., a vehicle type, identification information, a charge scheme, and the current location/the destination, etc.); map information (e.g., the latest road information, etc.); and information related to the power-supply equipment group 300 (e.g., the power supply schemes and installation locations of the multiple power-supply equipment stored in the power-supply equipment group 300, etc.). The vehicle control server 200 obtains weather information of the geographical region, including the current location of the vehicle 100 and the destination, from the weather information server 400. Based on these various information, the vehicle control server 200 creates a power-supply plan that ensures a travel route to the destination, which is appropriate for the vehicle 100, and a required power amount (a first amount of electric power) for the vehicle 100 to arrive at the destination from the current location along the travel route. The vehicle control server 200 functions as a controller for the vehicle 100.

The power-supply equipment group 300 includes the multiple wired power-supply equipment 310 and multiple wireless power-supply equipment 320, which are located around the nation. The wired power-supply equipment 310 supplies a vehicle with an electric power through a power supply cable of the power-supply equipment by a connector provided on a tip of the power supply cable being connected to an inlet of the vehicle. The wireless power-supply equipment 320 wirelessly supplies a vehicle with an electric power through an electromagnetic field, using a transmitter coil of the wireless power-supply equipment 320 and a receiving coil which is mounted on the vehicle.

In the embodiment, the wireless power supply includes "wireless power supply during traveling" and "wireless power supply during parking." The wireless power supply during traveling wirelessly supplies the vehicle 100 with an electric power from the wireless power-supply equipment 320 disposed on the travel lane. In the following, the travel lane on which the multiple wireless power-supply equipment 320 are disposed will also be referred to as a "power-supply lane" (a specified section). The wireless power supply during parking, in contrast, supplies the vehicle 100 during parking with an electric power from the wireless power-supply equipment 320 disposed at a power supply station or the like.

Figure 2:
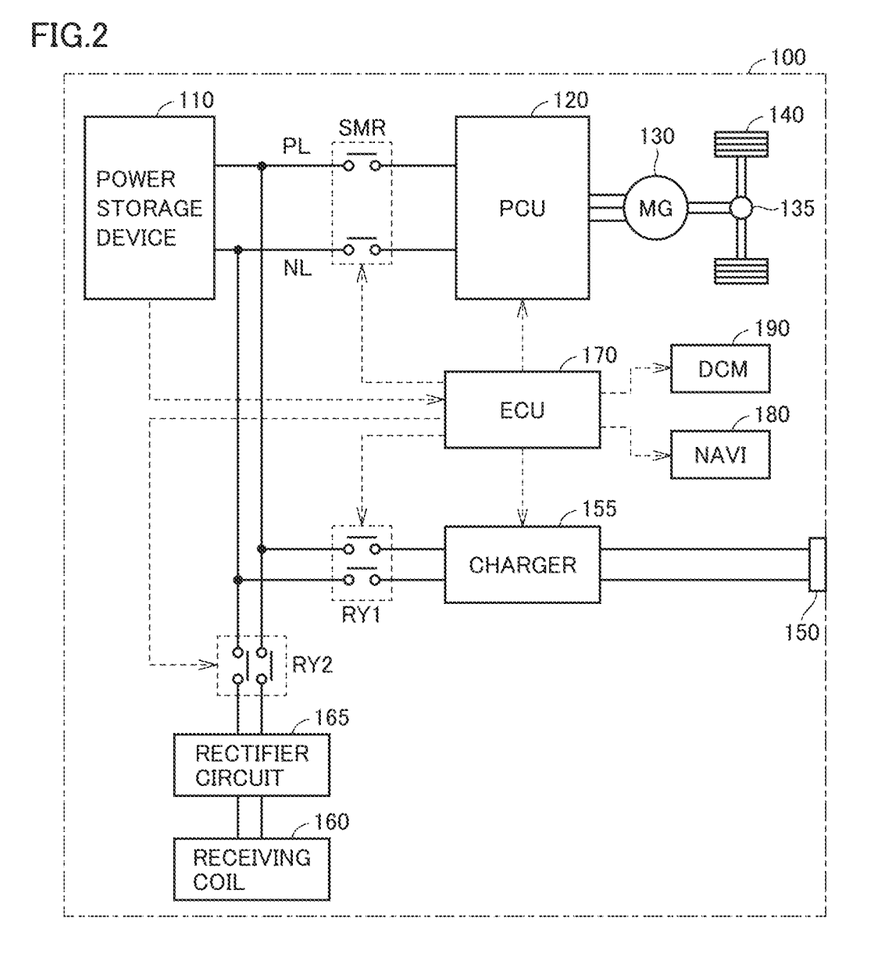
FIG. 2 is a diagram showing a configuration example of the vehicle of FIG. 1.

FIG. 2 is a diagram showing a configuration example of the vehicle 100 of FIG. 1. Referring to FIG. 2, the vehicle 100 includes a power storage device 110, a system main relay (SMR), a power control unit (PCU) 120, a motor generator 130, a mechanical-power transmission gear 135, and driving wheels 140. The vehicle 100 further includes an inlet 150, a charger 155, a receiving coil 160, a rectifier circuit 165, and charge relays RYx1 and RY2. The vehicle 100 still further includes an electronic control unit (ECU) 170, a navigation device 180, and a communications module 190.

The power storage device 110 is power storage element capable of charge and discharge of an electric power. The power storage device 110 includes, for example, a secondary battery such as a lithium-ion battery or a nickel-hydrogen battery, or a power storage element such as an electric double layer capacitor. The power storage device 110 stores an electric power for generating a travel driving force by the motor generator 130. The power storage device 110 supplies the stored electric power to the PCU 120 when the system main relay SMR is closed. The power storage device 110 outputs to the ECU 170 respective detection values of the voltage, current, and temperature of the power storage device 110, which are detected by sensors not shown.

The system main relay SMR is disposed on paired power lines PL and NL between the power storage device 110 and the PCU 120. The system main relay SMR switches between closed and open states, in accordance with control signals from the ECU 170.

The PCU 120 is a drive for driving the motor generator 130, and includes power conversion devices such as a converter and an inverter (none of which are shown). The PCU 120 is controlled by the ECU 170, and converts direct-current (DC) power, received from power storage device 110, into alternating-current (AC) power for driving the motor generator 130. The PCU 120 rectifies the electric power, which is generated by the motor generator 130 upon breaking of the vehicle 100, into the voltage level for the power storage device 110, and outputs the rectified electric power to the power storage device 110.

The motor generator 130 is an AC rotating electric machine, for example, a permanent-magnet, synchronous motor which includes a rotor having a permanent magnet embedded therein. The motor generator 130 is driven by the PCU 120 and thereby generates a travel driving force, which is transmitted to the driving wheels 140 through the mechanical-power transmission gear 135. Upon breaking of the vehicle 100, the motor generator 130 can generate an electric power by the rotational force of the driving wheels 140. The electric power generated as such is converted by the PCU 120 into an electric power for charging the power storage device 110, and stored in the power storage device 110.

The inlet 150 is connectable to the connector provided on the power supply cable of the wired power-supply equipment 310 (FIG. 1), and receives an electric power supplied from the wired power-supply equipment 310. The charger 155 is controlled by the ECU 170, and, when the external charging (the wired charging) for charging the power storage device 110 is performed by the wired power-supply equipment 310 connected to the inlet 150, the charger 155 converts an electric power input from the inlet 150 into one that can charge the power storage device 110. In the embodiment, AC power is supplied from the wired power-supply equipment 310 to the vehicle 100, and the charger 155 is configured of an AC to DC converter. However, if a DC power is supplied from the wired power-supply equipment 310 to the vehicle 100 (in the case of DC wired charging), the vehicle 100 may not include the charger 155.

The charge relay RY1 is disposed on electrical paths between the charger 155 and the power storage device 110, and controlled by the ECU 170 to be brought into the closed state when the vehicle 100 performs the wired charging by the wired power-supply equipment 310.

The receiving coil 160 is capable of wirelessly receiving an electric power from the transmitter coil of the wireless power-supply equipment 320 (FIG. 1) through the electromagnetic field, and, when the vehicle 100 performs the external charging (the wireless charging) in which the power storage device 110 is charged by the wireless power-supply equipment 320, the receiving coil 160 receives the electric power supplied from the wireless power-supply equipment 320. The rectifier circuit 165 rectifies and outputs the AC power received by the receiving coil 160 to the power storage device 110.

The charge relay RY2 is disposed on electrical paths between the rectifier circuit 165 and the power storage device 110, and controlled by the ECU 170 to be brought into the closed state when the vehicle 100 performs the wireless charging by the wireless power-supply equipment 320.

The ECU 170 receives signals from the various sensors, outputs control signals to a respective device, and controls the vehicle 100 and the respective device. The ECU 170 performs various controls related to the traveling of the vehicle 100 (e.g., a drive control, a breaking control, and a steering control, etc.). When the vehicle 100 performs external charging by the wired power-supply equipment 310 (FIG. 1), the ECU 170 turns the charge relay RY1 on and performs the wired charging for charging the power storage device 110, using the inlet 150 and the charger 155. When the vehicle 100 performs external charging by the wireless power-supply equipment 320 (FIG. 1), in contrast, the ECU 170 turns the charge relay RY2 on and performs the wireless charging for charging the power storage device 110, using the receiving coil 160 and the rectifier circuit 165.

The navigation device 180 shows on a display 182 (described later) the travel route from the current location of the vehicle 100 to the destination set by a driver. As a power-supply plan, the navigation device 180 shows the current location of the vehicle 100, the location of the destination set by the driver, the travel route from the current location to the destination, and an amount of time taken for charging during parking at a specified point included in the travel route. As described below, in the embodiment, the location information indicative of the current location of the vehicle 100, and the location information indicative of the destination set by the driver are transmitted to the vehicle control server 200 as vehicle information. The vehicle control server 200 then determines a travel route to the destination and a power-supply plan, taking into account the vehicle information, the information regarding the power-supply equipment group 300, and the weather information.

The communications module 190 is an on-board data communication module (DCM), and capable of two-way data communications with the vehicle control server 200 through a communication network. The communications module 190 is also capable of communications with a communication device for the power-supply equipment group 300 (in particular, power-supply equipment (described later) for wireless power supply during traveling, which includes multiple wireless power-supply equipment 320).

Figure 3:
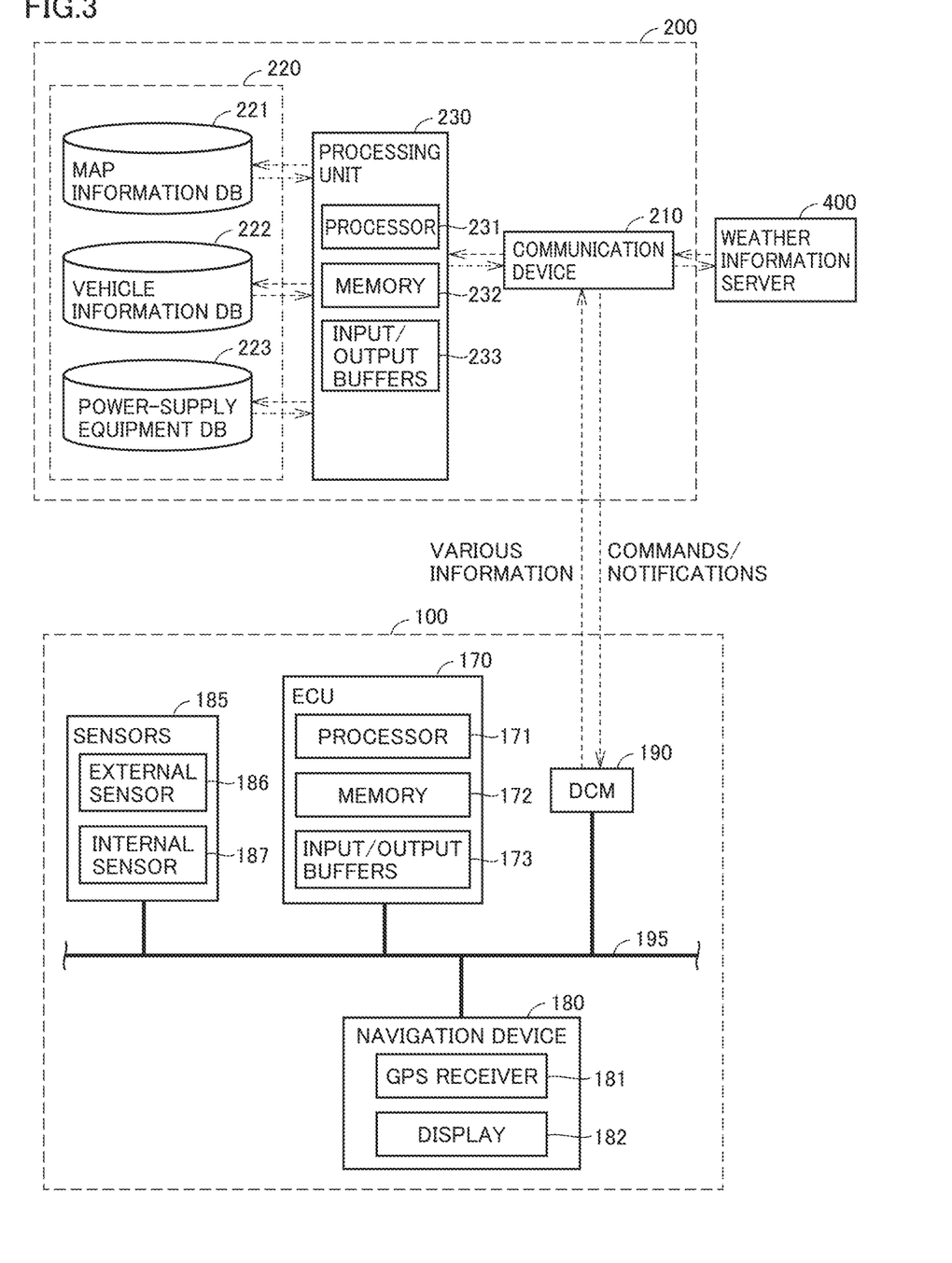
FIG. 3 is a diagram showing a configuration of the vehicle and a vehicle control server in a greater detail.

FIG. 3 is a diagram showing a configuration of the vehicle 100 and the vehicle control server 200 in a greater detail. Note that the vehicle 100 will be described only with respect to the ECU 170, the navigation device 180, the communications module 190, and sensors 185 (described later).

Referring to FIG. 3, the vehicle 100 further includes the sensors 185. The ECU 170, the navigation device 180, the communications module 190, and the sensors 185 are capable of communications with each other through an on-board network 195 such as a controller area network (CAN).

The ECU 170 includes a processor 171 such as a central processing unit (CPU), a memory 172, and input/output buffers 173. The memory 172 includes a read only memory (ROM) and a random access memory (RAM), none of which are shown. The processor 171 deploys programs stored in the ROM into the RAM, and executes the programs. Various processes are written in the programs stored in the ROM, which are performed by the ECU 170.

In response to signals from the respective sensors 185, the ECU 170 controls the devices so that the vehicle 100 is brought into a desired state. For example, the ECU 170 controls the PCU 120 (FIG. 2), thereby performing various controls for achieving the traveling of the vehicle 100. The ECU 170 also receives detection values of the voltage and current of the power storage device 110, and, calculates a state of charge (SOC) of the power storage device 110, based on the detection values.

When the connector of the wired power-supply equipment 310 is connected to the inlet 150, the ECU 170 brings the charge relay RY1 into the closed state, controls the charger 155, and performs the wired charging for charging the power storage device 110 by the wired power-supply equipment 310. If the receiving coil 160 can receive an electric power from the wireless power-supply equipment 320, the ECU 170 brings the charge relay RY2 into the closed state, controls the receiving coil 160 in receiving an electric power from the wireless power-supply equipment 320, and performs the wireless charging for charging the power storage device 110 by the wireless power-supply equipment 320.

The ECU 170 controls the PCU 120 and a steering device (not shown), thereby performing various controls for achieving autonomous driving of the vehicle 100. The autonomous driving refers to driving operations such as acceleration, deceleration, and steering of the vehicle 100, which are performed without the driver's driving operations. Under the autonomous driving by the ECU 170, the ECU 170 requires no driving operation from the driver under any circumstances. Note that the vehicle 100 may not be capable of the autonomous driving.

In order to achieve the autonomous driving, the vehicle 100 includes the sensors 185 that detect the external and internal conditions of the vehicle 100. The sensors 185 include an external sensor 186 and an internal sensor 187. The external sensor 186 detects external conditions of the vehicle 100. The internal sensor 187 detects information in response to a traveling state of the vehicle 100, steering operation, acceleration, and braking.

The external sensor 186 includes, for example, a camera, a radar, and a LIDAR (laser imaging detection and ranging), none of which are shown. The camera captures an image of the external conditions of the vehicle 100, and outputs the captured information related to the external conditions of the vehicle 100 to the ECU 170. The radar transmits radio waves (e.g., millimeter waves) around the vehicle 100, receives radio waves reflected off an obstacle, and thereby detects the obstacle. The radar then outputs the distance to the obstacle and the direction of the obstacle to the ECU 170 as obstacle information related to the obstacle. The LIDAR transmits light (typically, ultraviolet light, visible light, or near infrared light) around the vehicle 100, receives light reflected off an obstacle, and thereby measures the distance to the reflection point and detects the obstacle. The LIDAR, for example, outputs the distance to the obstacle and the direction of the obstacle to the ECU 170 as obstacle information.

The internal sensor 187 includes, for example, a vehicle-speed sensor, an acceleration sensor, or a yaw-rate sensor, none of which are shown. The vehicle-speed sensor is disposed on, for example, a wheel of the vehicle 100 or the drive shaft that integrally rotates with the wheel, detects the rotational speed of the wheel, and outputs vehicle-speed information, including the speed of the vehicle 100, to the ECU 170. The acceleration sensor includes, for example, a longitudinal acceleration sensor for detecting the acceleration of the vehicle 100 in the longitudinal direction of the vehicle 100, and a lateral acceleration sensor for detecting the lateral acceleration of the vehicle 100, and outputs acceleration information, including both accelerations, to the ECU 170. The yaw-rate sensor detects a yaw rate (an angular speed of rotation) about the vertical axis of the center of mass of the vehicle 100. The yaw-rate sensor is, for example, a gyro sensor, and outputs yaw rate information, including the yaw rate of the vehicle 100, to the ECU 170.

The navigation device 180 includes a GPS receiver 181 and the display 182 (a display device). The GPS receiver 181 locates the vehicle 100, based on radio waves from an artificial satellite (not shown). The display 182 has a touch panel function, displays various information, and receives user's various operations. For example, the display 182 shows a road map of the area around the vehicle 100, having the current location of the vehicle 100 superimposed thereon. The display 182 also receives various operations, including a destination set operation, and a selection operation on a presented (shown) travel route, etc.

In the embodiment, as the destination is set by the operations on the display 182, the navigation device 180 outputs the information regarding the set destination to the ECU 170, together with the information regarding the current location of the vehicle 100 obtained by the GPS receiver 181. The ECU 170 transmits the location information indicative of the current location of the vehicle 100 and the destination, the travel route from the current location to the destination, and a create power-supply plan request to the vehicle control server 200, by the communications module 190. At this time, the ECU 170 transmits the information about the charge schemes (wired/wireless) supported by the vehicle 100 to the vehicle control server 200.

The vehicle control server 200 includes a communication device 210, a memory device 220, and a processing unit 230. The communication device 210 is capable of two-way data communication with the communications module 190 of the vehicle 100 and the weather information server 400, through communication networks.

The memory device 220 includes a map information database (DB) 221, a vehicle information database (DB) 222, and a power-supply equipment database (DB) 223. The map information DB 221 stores data related to the latest road map. The vehicle information DB 222 stores various information regarding the vehicle 100. Specifically, the vehicle information DB 222 stores the vehicle information (the location information of the vehicle (the current location/the destination), the vehicle type, and the charge schemes (wired/wireless) supported by the vehicle, etc.), which are obtained from the vehicle 100, in association with an ID given to the vehicle 100. Note that the control system 1 is available to multiple vehicles, and the vehicle information DB 222 stores information regarding multiple vehicles 100.

The power-supply equipment DB 223 stores information regarding the respective power-supply equipment included in the power-supply equipment group 300 (FIG. 1). For example, the power-supply equipment DB 223 stores the location information of each power-supply equipment and the information of the power supply scheme (wired/wireless), in association with an ID given for each charging equipment.

Note that the map information DB 221 and the power-supply equipment DB 223 are periodically updated. As the destination of the vehicle 100 is set and the vehicle information is thereby obtained from the vehicle 100, the vehicle information DB 222 is updated based on the obtained vehicle information.

The processing unit 230 includes a processor 231 such as a CPU, a memory 232, and input/output buffers 233. The memory 232 includes a ROM and a RAM, none of which are shown. The CPU 231 deploys programs stored in the ROM into the RAM, and executes the programs. Various processes are written in the programs stored in the ROM, which are performed by the processing unit 230.

Upon receiving the travel route and the create power-supply plan request from the vehicle 100, the processing unit 230 creates a travel route from the current location of the vehicle 100 to the destination and a power-supply plan, based on various information, including the map information stored in the map information DB 221, the vehicle information stored in the vehicle information DB 222, the information related to the power-supply equipment stored in the power-supply equipment DB 223, and the weather information broadcasted by the weather information server 400.

The processing unit 230 creates a travel route that has a shortest travel distance to the destination. The processing unit 230 may create a travel route that has a least required amount of time to the destination, instead of having a shortest travel distance.

The processing unit 230 transmits the route information to the vehicle 100 for displaying the travel route and the power-supply plan on the vehicle 100. Upon receiving the route information from the vehicle control server 200, the vehicle 100 displays the travel route and the power-supply plan on the display 182 of the navigation device 180. Although not shown particularly, it should be noted that the processing unit 230 may transmit the route information to a mobile terminal (such as smartphone) of the driver, and the travel route and the power-supply plan may be displayed on the mobile terminal of the driver.

Figure 4:
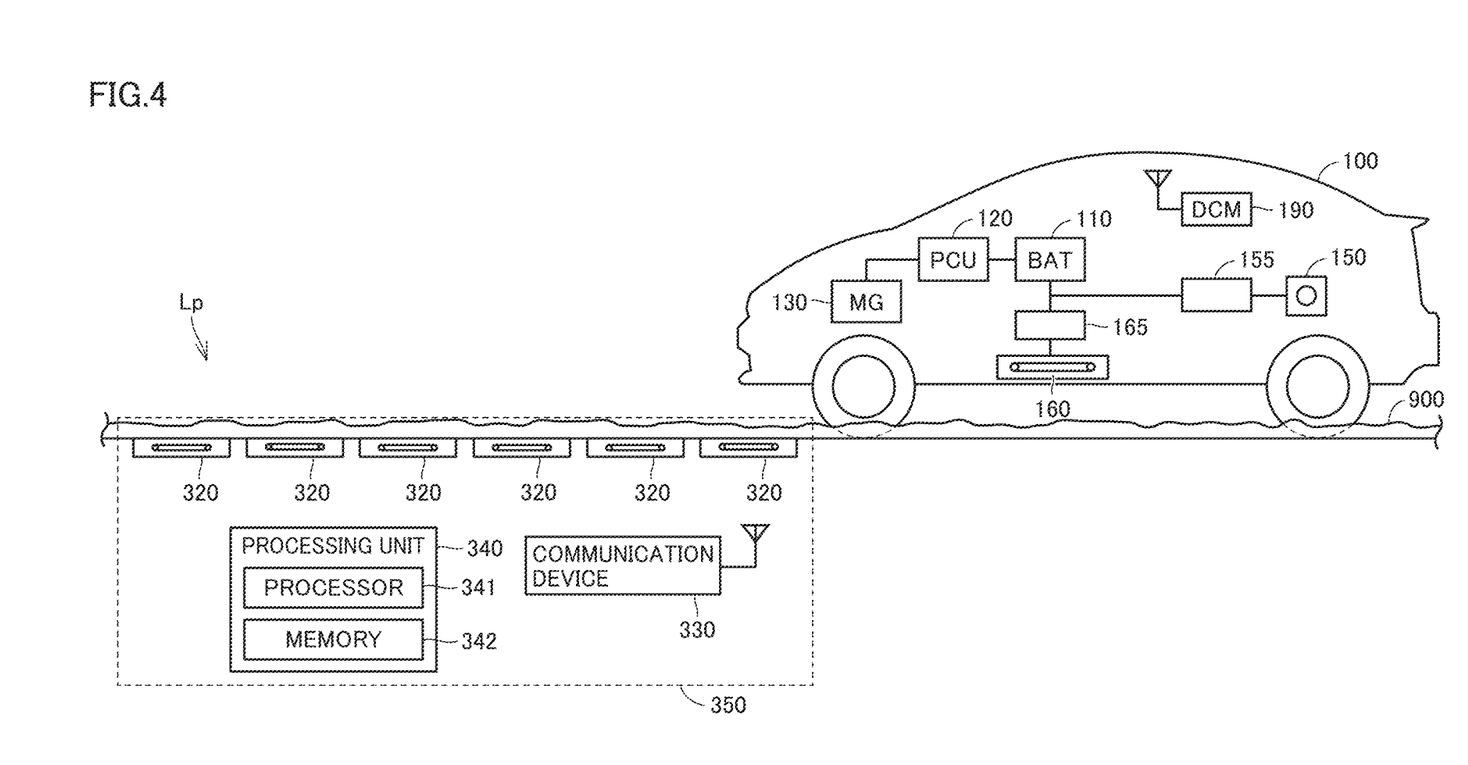
FIG. 4 is a diagram illustrating one example of a power-supply system disposed along a power-supply lane.

FIG. 4 is a diagram illustrating one example of a power-supply system 350 disposed along a power-supply lane Lp. Referring to FIG. 4, the power-supply system 350 used for the wireless power supply during traveling, includes the multiple wireless power-supply equipment 320, a communication device 330, and a processing unit 340. While FIG. 4 shows six wireless power-supply equipment 320, it should be noted that the number of wireless power-supply equipment 320 is not limited thereto.

Each wireless power-supply equipment 320 includes a transmitter coil, and receives supply of an electric power from an AC power supply, none of which are shown. The wireless power-supply equipment 320 forms an electromagnetic field around the transmitter coil, and thereby wirelessly transmits an electric power to the receiving coil 160 of the vehicle 100 coupled to the transmitter coil through the electromagnetic field.

The communication device 330 is capable of wide area communications with the communication device 210 of the vehicle control server 200 through communication networks. The communication device 330 is also capable of short-range wireless communications with the communications module 190 of the vehicle 100.

The processing unit 340 includes a processor 341 such as a CPU, and a memory 342. The memory 342 includes a ROM and a RAM, none of which are shown. The CPU 341 deploys programs stored in the ROM into the RAM, and executes the programs. Various processes are written in the programs stored in the ROM, which are performed by the processing unit 340.

When the wireless charging is to be performed during traveling, the vehicle 100 transmit a vehicle ID identifying the vehicle 100 and the information regarding the vehicle 100 to the vehicle control server 200 through the communications module 190. The information includes, for example, a requesting electric power (or a requesting amount of electric power) indicative of a required value of an electric power (or amount of electric power) received from the power-supply system 350, the current location information of the vehicle 100, and the information regarding the receiving coil 160 (such as the size, or the height from the ground).

Upon receiving the vehicle ID and the information of the vehicle 100 from the vehicle 100, the vehicle control server 200 stores these information into the vehicle information DB 222, and also transmits them to the power-supply system 350 through the communication device 210.

Upon receiving the vehicle ID and the information of the vehicle 100 from the vehicle control server 200, the power-supply system 350 registers the vehicle ID of the vehicle 100 with a list of identification information registering the vehicle IDs of vehicles that are likely to receive supply of an electric power from the power-supply system 350.

After transmitting the vehicle ID and the information of the vehicle 100 to the vehicle control server 200, the vehicle 100 sends the vehicle ID of the vehicle 100 by short-range wireless communications through the communications module 190. The power-supply system 350 receives the vehicle ID sent from the vehicle 100 by the communication device 330. As the power-supply system 350 matches the vehicle ID with vehicle IDs registered with the list of identification information and senses that the vehicle 100 is approaching the power-supply system 350, the power-supply system 350 changes to an active state in which an electric power is supplied to the wireless power-supply equipment 320. As the receiving coil 160 in the vehicle 100 reaches over the wireless power-supply equipment 320 in this state, an electric power is wirelessly transmitted from the power-supply equipment 320 to the receiving coil 160 of the vehicle 100 through the electromagnetic field.

If the communication device 330 included in the power-supply system 350 is no longer able to receive the vehicle ID which is sent from the vehicle 100 by short-range wireless communications, the supply of electric power to the wireless power-supply equipment 320 is stopped, terminating the supply of power from the electric power-supply system 350 to the vehicle 100.

Deposition 900 originated from the weather (e.g., snow or the Asian dust) is present on the power-supply lane Lp. If the deposition 900 is present on the power-supply lane Lp, the deposition 900 prevents the electromagnetic coupling between the transmitter coils of the multiple wireless power-supply equipment 320. In that case, the power-supply volume from the wireless power-supply equipment 320 to the vehicle 100 during traveling can be reduced less than the power-supply volume when no deposition 900 is present on the power-supply lane Lp. If the vehicle 100 follows a power-supply plan that fails to take into account the reduction of the power-supply volume from the wireless power-supply equipment 320 due to the deposition 900, a required power amount from the current location of the vehicle 100 to the destination may not be ensured according to the power-supply plan. As a result, the amount of electric power of the vehicle 100 may run short part way through the travel route from the current location to the destination, which may prevent the vehicle 100 from arriving at the destination.

Thus, in the control system 1, the vehicle control server 200 creates, using the weather information regarding the geographical region including the power-supply lane Lp obtained from the weather information server 400, a power-supply plan in which the ratio of the amount of electric power (a second amount of electric power), which is supplied from the wireless power-supply equipment 320 to the vehicle 100 (a ratio of the wireless power supply), to a required power amount when the deposition 900 is determined to be present on the power-supply lane Lp (a first case) is less than the ratio of the wireless power supply to the required power amount when the deposition 900 is determined to be not present on the power-supply lane Lp (a second case). The vehicle control server 200 increases the ratio of the amount of electric power supplied to the vehicle 100 during parking to the required power amount when the deposition 900 is determined to be present on the power-supply lane Lp than when the deposition 900 is determined to be not present on the power-supply lane Lp. The power-supply plan created by the vehicle control server 200, since it takes into account the reduction of the power-supply volume by the wireless power-supply equipment 320 due to the deposition 900, ensures the required power amount for the vehicle 100 to arrive at the destination from the current location according to the power-supply plan. As a result, the vehicle 100 that is traveling according to the power-supply plan can be prevented from the power shortfall.

Figure 5:
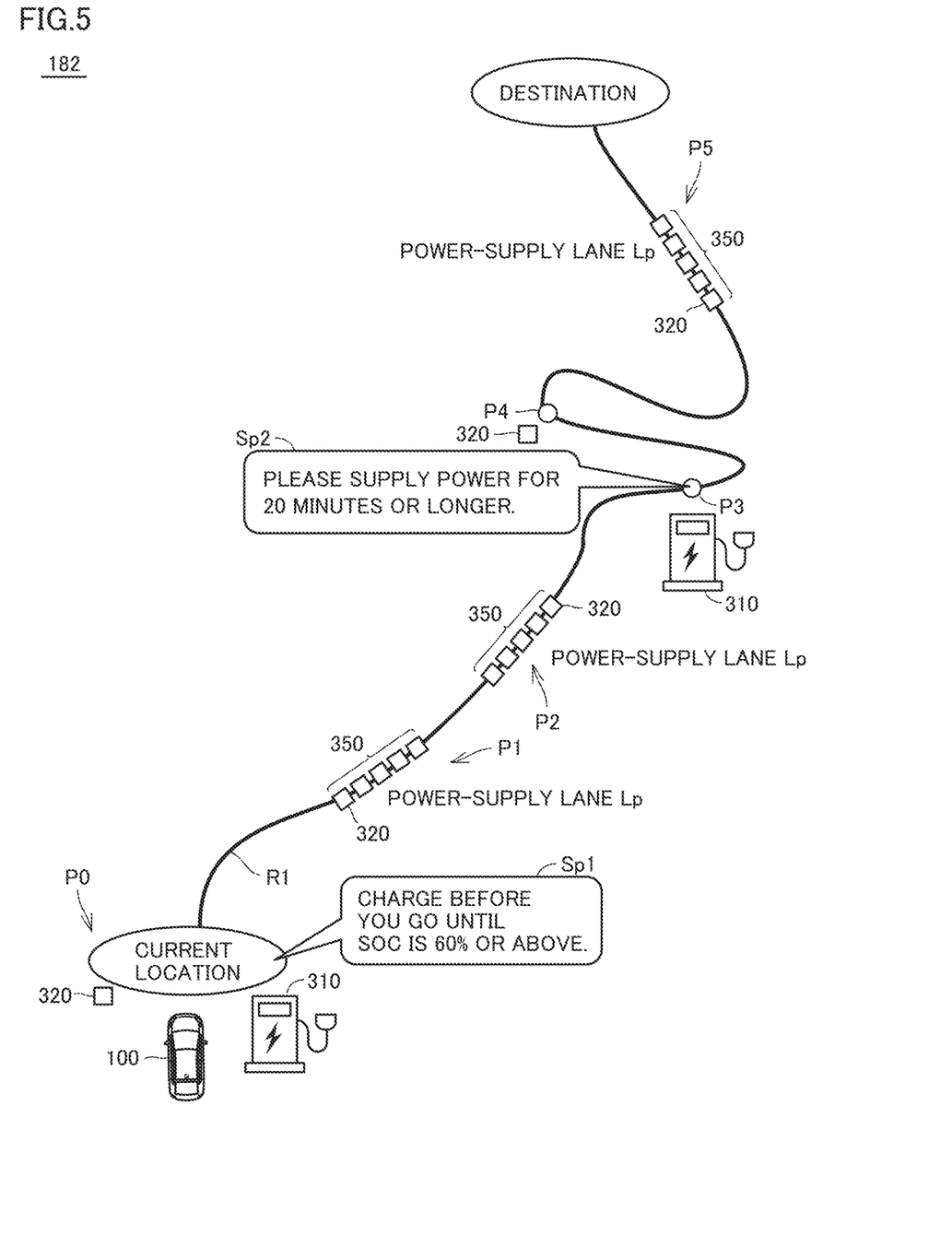
FIG. 5 is a diagram illustrating a display showing a travel route and a power-supply plan which are created by the vehicle control server of FIG. 3 when snow information and Asian dust information are not included in the weather information of a geographical region including the current location of the vehicle and the destination.

FIG. 5 is a diagram illustrating the display 182 showing a travel route R1 and a power-supply plan that are created by the vehicle control server 200 of FIG. 3 when the snow information and the Asian dust information are not included in the weather information regarding the geographical region including the current location of the vehicle 100 and the destination. Referring to FIG. 5, the travel route R1 includes power-supply points P0, P1, P2, P3, P4, and P5. The power-supply plan in FIG. 5 includes power-supply indicators Sp1 and Sp2.

The power-supply point P0 is the current location (the origin) of the vehicle 100. The wired power-supply equipment 310 (specified power-supply equipment) and the wireless power-supply equipment 320 (specified power-supply equipment) are disposed at the power-supply point P0. At the power-supply point P0, the vehicle 100 can perform wired charging by the wired power-supply equipment 310 and wireless charging by the wireless power-supply equipment 320, during parking. In FIG. 5, the power-supply indicator Sp1 is displayed for the power-supply point P0, showing a message "Charge before you go until SOC is 60% or above."

The power-supply lane Lp, which includes the power-supply system 350, is disposed at the respective power-supply points P1, P2, and P5. The vehicle 100 can receive wireless power supply from the power-supply system 350 while traveling on the power-supply lanes Lp corresponding to the power-supply points P1, P2, and P5.

The power-supply points P3 and P4 are facilities along the travel route R1 (e.g., a shopping mall or a convenience store, etc.). The wired power-supply equipment 310 is disposed at the power-supply point P3. At the power-supply point P3, the vehicle 100 can perform wired charging by the wired power-supply equipment 310. The wireless power-supply equipment 320 is disposed at the power-supply point P4. At the power-supply point P4, the vehicle 100 can perform wireless charging by the wireless power-supply equipment 320 during parking. In FIG. 5, the power-supply indicator Sp2 is displayed for the power-supply point P3, showing a message "Please supply power for 20 minutes or longer."

Figure 6:
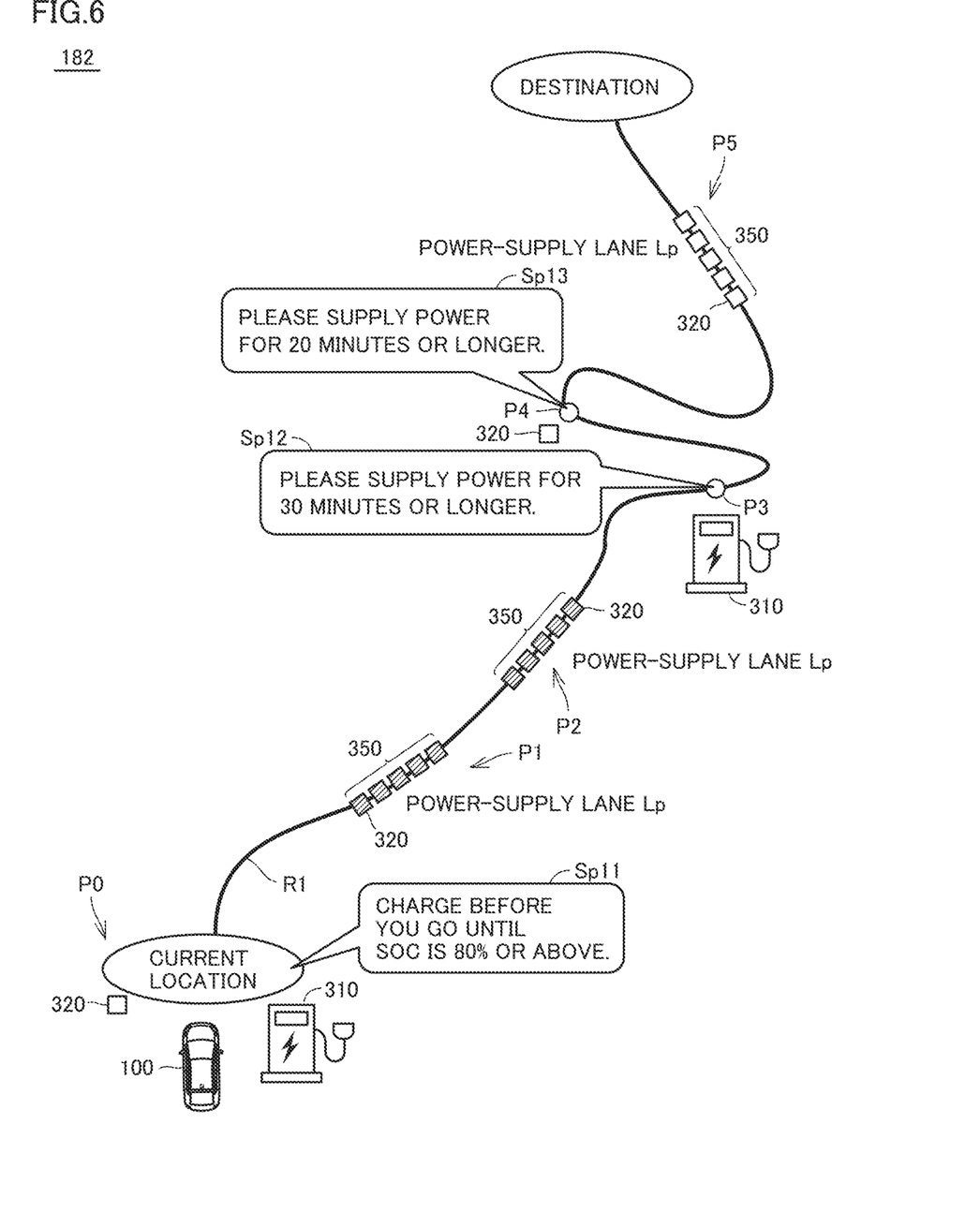
FIG. 6 is a diagram illustrating the display showing a travel route and a power-supply plan that are created by the vehicle control server of FIG. 3 when snow information and Asian dust information are included in the weather information of the geographical region including the current location of the vehicle and the destination.

FIG. 6 is a diagram showing the display 182 showing the travel route R1 and a power-supply plan that are created by the vehicle control server 200 of FIG. 3 when snow information or the Asian dust information are included in the weather information regarding the geographical region including the current location of the vehicle 100 and the destination. In FIG. 6, deposition is predicted to be present on the power-supply lanes Lp that are disposed at the power-supply points P1 and P2. Referring to FIG. 6, the power-supply plan includes power-supply indicators Sp11, Sp12, and Sp13. The power-supply indicator Sp11 is displayed for the power-supply point P0, showing a message "Charge before you go until the SOC is 80% or above." The power-supply indicator Sp12 is displayed for the power-supply point P3, showing a message "Please supply power for 30 minutes or longer." The power-supply indicator Sp13 is displayed for the power-supply point P4, showing a message "Please supply power for 20 minutes or longer."

Comparing FIGS. 5 and 6, the amounts of electric power supplied to the vehicle 100 during parking at the power-supply points P0, P3, and P4 are greater in FIG. 6 than in FIG. 5. Since FIGS. 5 and 6 are the same in the required power amount for the vehicle 100 to arrive at the destination from the current location along the travel route R1, the ratio of the wireless power supply during traveling is less in FIG. 6. In particular, the SOC of the power storage device 110 included in the vehicle 100 at the power-supply point P0, which is the current location of the vehicle 100, is increased greater in FIG. 6 than in FIG. 5. Thus, the vehicle can be prevented from the power shortfall before arriving at the destination, even if the power-supply volume by the wireless power-supply equipment 320 disposed along the power-supply lane Lp is reduced due to the deposition.

Figure 7:
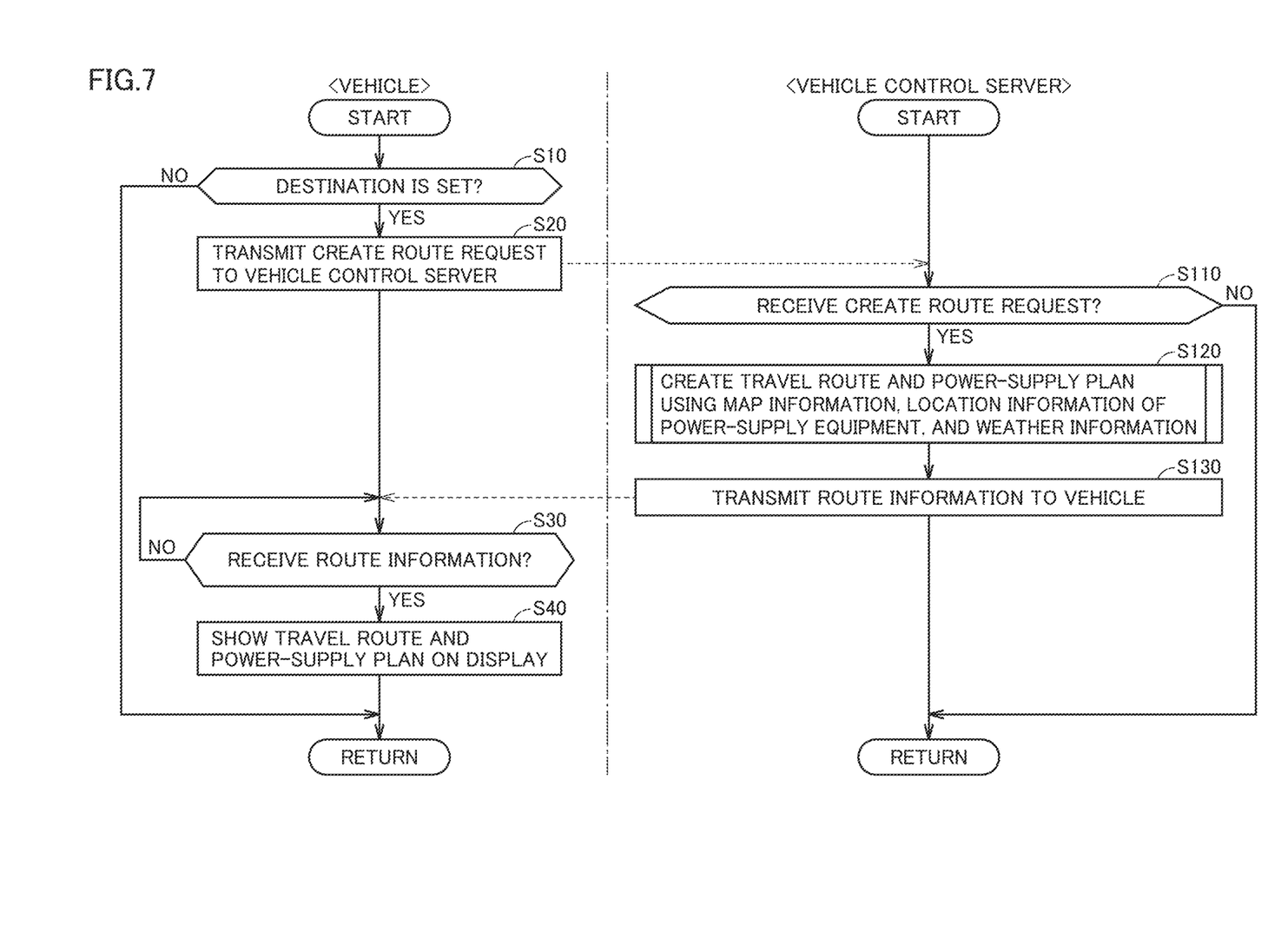
FIG. 7 is a flowchart of one example procedure of processes which are performed by the vehicle and the vehicle control server to create a travel route for the vehicle.

FIG. 7 is a flowchart of one example procedure of processes which are performed by the vehicle 100 and the vehicle control server 200 to create a travel route for the vehicle 100. The series of process steps illustrated in the flowchart are repeated in the vehicle 100 and the vehicle control server 200 for every predetermined period or for each time a predetermined condition is satisfied.

Referring to FIG. 7, the ECU 170 determines whether the destination is set on the navigation device 180 in the vehicle 100 (step S10). If no destination is set (NO in step S10), the ECU 170 proceeds to the return, without performing the subsequent series of process steps.

If the destination is set (YES in step S10), the ECU 170 transmits the information of the vehicle 100 (the vehicle information) and a create route request, including a travel route and a create power-supply plan request, to the vehicle control server 200 through the communications module 190 (step S20). The vehicle information transmitted to the vehicle control server 200 includes the information indicative of the current location of the vehicle 100 and the destination, and the information regarding the charge scheme (wired/wireless) supported by the vehicle 100. Note that the create route request is transmitted to the vehicle control server 200 when the destination is set on the navigation device 180, and is not repeatedly transmit while the destination is being set.

Subsequently, the ECU 170 determines whether the vehicle 100 receives from the vehicle control server 200 the route information which includes the travel route and the power-supply plan, which are created by the vehicle control server 200 according to the create route request (step S30). If the vehicle 100 receives the route information from the vehicle control server 200 (YES in step S30), the ECU 170 shows the travel route and the power-supply plan, included in the route information, on the display 182 of the navigation device 180 (step S40). By viewing the display 182, the driver of the vehicle 100 is allowed to know the actual travel route, a power-supply point at which the driver should perform charging during parking, and the charging conditions (e.g., the charge time or the value of the SOC) to be satisfied at the power-supply point.

In the vehicle control server 200, on the other hand, the processing unit 230 determines whether the vehicle control server 200 receives a create route request from the vehicle 100 (step S110). If the vehicle control server 200 does not receive a create route request (NO in step S110) the processing unit 230 proceeds to the return, without performing the subsequent series of process steps.

If the vehicle control server 200 receives the create route request (YES in step S110), the processing unit 230 creates a travel route from the current location of the vehicle 100 to the destination and a power-supply plan for the vehicle 100 included in the vehicle information contained in the create route request (step S120). As the travel route and the power-supply plan are created in step S120, the processing unit 230 transmits the route information, including the travel route and the power-supply plan, to the vehicle 100 through the communication device 210 (step S130).

Figure 8:
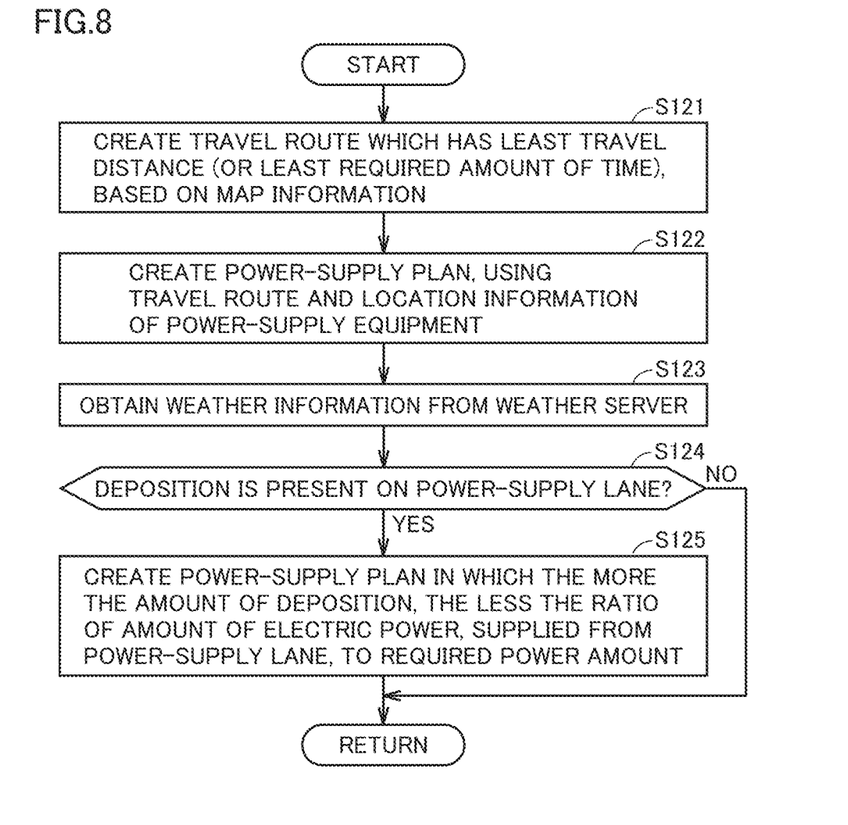
FIG. 8 is a flowchart of one specific example procedure of the process of creating the travel route and power-supply plan of FIG. 7.

FIG. 8 is a flowchart of one specific example procedure of the process (step S120) of creation of the travel route and the power-supply plan of FIG. 7. Referring to FIG. 8, the processing unit 230 creates a travel route which has a least travel distance (or a least required amount of time) from the current location of the vehicle 100 to the destination, based on the map information included in the map information DB 221 (step S121). The processing unit 230 creates a power-supply plan, based on the travel route and the location information of the power-supply equipment stored in the power-supply equipment DB 223 (step S122). The processing unit 230 obtains weather information from the weather server (step S123).

Using the weather information, the processing unit 230 determines whether the deposition 900 is present on the power-supply lane Lp included in the travel route (step S124). If the processing unit 230 determines that the deposition 900 is present on the power-supply lane Lp (YES in step S124), the processing unit 230 creates a power-supply plan in which the more the amount of deposition 900 present on the power-supply lane Lp, the less the ratio of the amount of electric power supplied from the power-supply lane Lp to the required power amount (step S125). If the processing unit 230 determines that the deposition 900 is not present on the power-supply lane Lp (NO in step S124), the processing unit 230 proceeds to the return, without performing step S124.

The processing unit 230 creates a power-supply plan in which the ratio of the amount of electric power (a power-supply volume during traveling), which is supplied from the power-supply lane Lp, to the required power amount is less when a great amount of deposition 900 is present on the power-supply lane Lp than when a less amount of deposition 900 is present on the power-supply lane Lp. The ratio of the power-supply volume during traveling to the required power amount is changed in the power-supply plan in response to an amount deposition present on the power-supply lane Lp, thereby ensure the required power amount according to the power-supply plan, and inhibiting a required amount of time from the current location of the vehicle to the destination from increasing in association with an increase in an amount of an electric power charged during parking.

While, in the embodiment, the vehicle control server 200, different from the vehicle 100, has a configuration (the vehicle controller) that creates the travel route and the power-supply plan, it should be noted that the vehicle 100 may has some or all the configuration.

[Variation]

If the vehicle 100 is capable of autonomous driving, the vehicle 100 may travel by the autonomous driving to the destination, according to the created travel route. According to a variation of the embodiment, the vehicle 100 can travel by the autonomous driving to the destination, according to the travel route.

Figure 9:
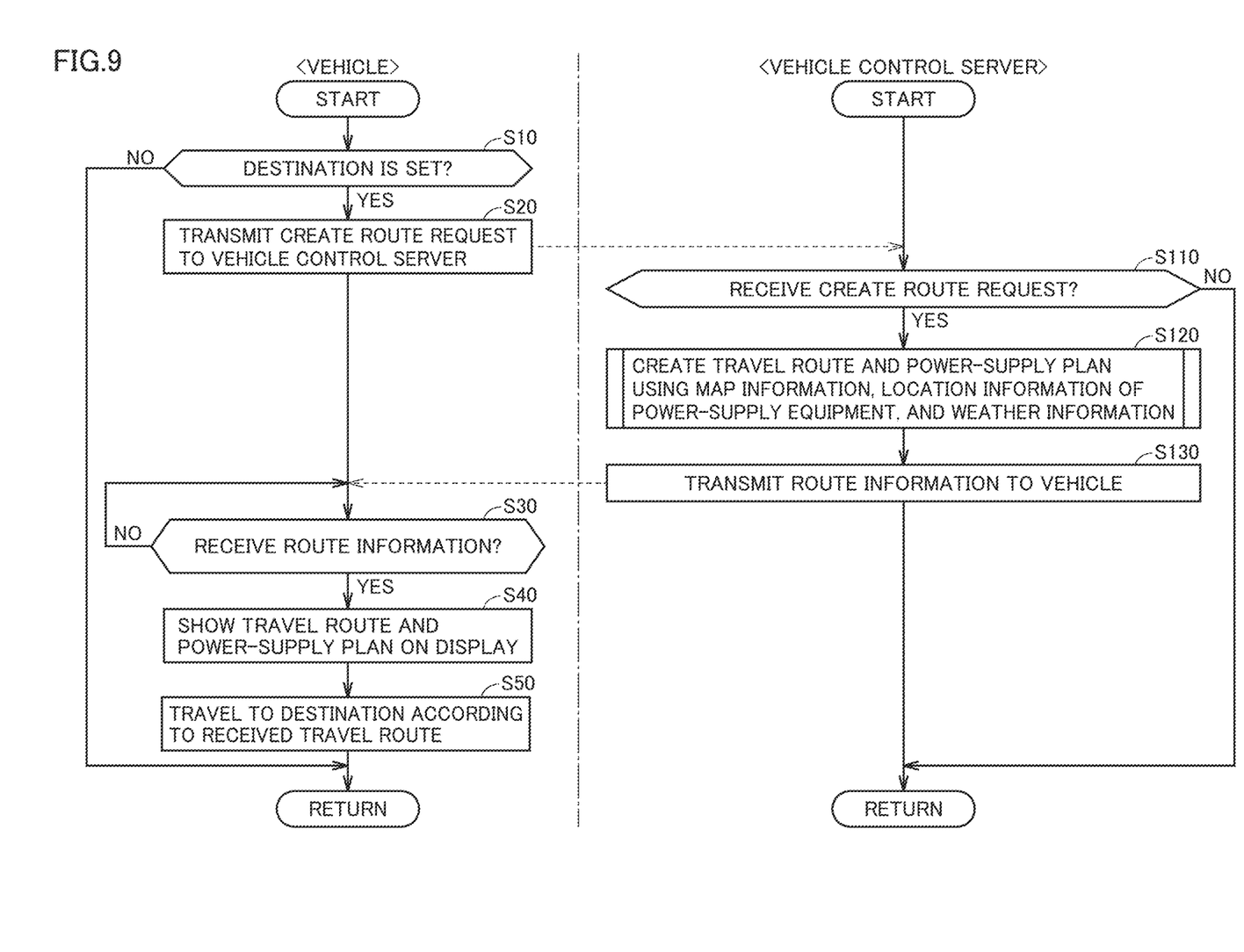
FIG. 9 is a flowchart of one example procedure of processes which are performed by the vehicle and the vehicle control server, according to a variation of the embodiment.

FIG. 9 is a flowchart of one example procedure of processes which are performed by the vehicle 100 and the vehicle control server 200, according to the variation of The embodiment. The flowchart of FIG. 9 is the same as the flowchart of FIG. 7, except for further including step S50.

In the vehicle 100, the ECU 170 performs steps S10, S20, S30, and S40 as with the embodiment, and travels to the destination by autonomous driving according to the received travel route (step S50). Note that the other process steps performed by the vehicle 100 and the process steps performed by the vehicle control server 200 are the same as those shown in the flowchart of FIG. 7.

As described above, according to the embodiment and the variation thereof, the vehicle that is traveling according to the power-supply plan can be prevented from the power shortfall.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle controller for controlling a vehicle capable of being charged with an electric power that is supplied from outside the vehicle during traveling or parking, the vehicle controller comprising:
a memory device storing information regarding each of a plurality of power-supply equipment; and
a processing unit that creates a travel route for the vehicle from a current location to a destination, and a power-supply plan that ensures a first amount of electric power needed for the vehicle to arrive at the destination from the current location along the travel route, wherein
the information regarding each of the plurality of power-supply equipment includes location information of the power-supply equipment and information indicating whether the power-supply equipment is wired power-supply equipment or wireless power-supply equipment,
the travel route includes at least one specified section in which at least one wireless power-supply equipment, among the plurality of power-supply equipment, is disposed,
the at least one wireless power-supply equipment is capable of supplying an electric power to the vehicle during traveling on the at least one specified section, and
using weather information including the at least one specified section, the processing unit creates the power-supply plan in which a ratio of a second amount of electric power, which is supplied from the at least one wireless power-supply equipment to the vehicle, to the first amount of electric power is less in a first case in which deposition is determined to be present on the at least one specified section than in a second case in which deposition is determined to be not present on the at least one specified section.

2. The vehicle controller according to claim 1, wherein the processing unit creates the power-supply plan in which the ratio of the second amount of electric power to the first amount of electric power is less when a great amount of deposition is present on the at least one specified section than when a less amount of deposition is present on the at least one specified section.

3. The vehicle controller according to claim 1, wherein the vehicle includes a power storage device,
the plurality of power-supply equipment include specified power-supply equipment disposed at the current location, and
the processing unit creates the power-supply plan in which a state of charge of the power storage device when the vehicle leaves the current location is increased higher in the first case than in the second case, by charging the power storage device using the specified power-supply equipment.

4. The vehicle controller according to claim 1, wherein the vehicle includes a display device, and
the processing unit outputs route information for showing the travel route and the power-supply plan on the display device.

5. The vehicle controller according to claim 1, wherein the processing unit outputs route information for allowing the vehicle, capable of autonomous driving, to travel by the autonomous driving to the destination, according to the travel route.

6. A vehicle control system, comprising:
a vehicle capable of being charged with an electric power that is supplied from outside the vehicle during traveling or parking;
a memory device storing information regarding the vehicle and information regarding each of a plurality of power-supply equipment; and
a processing unit that creates a travel route for the vehicle from a current location to a destination, and a power-supply plan that ensures a first amount of electric power needed for the vehicle to arrive at the destination from the current location along the travel route, wherein
the information regarding each of the plurality of power-supply equipment includes location information of the power-supply equipment and information indicating whether the power-supply equipment is wired power-supply equipment or wireless power-supply equipment,
the travel route includes at least one specified section in which at least one wireless power-supply equipment, among the plurality of power-supply equipment, is disposed,
the at least one wireless power-supply equipment is capable of supplying an electric power to the vehicle during traveling on the at least one specified section, and
using weather information including the at least one specified section, the processing unit creates the power-supply plan in which a ratio of a second amount of electric power, which is supplied from the at least one wireless power-supply equipment to the vehicle, to the first amount of electric power is less in a first case in which deposition is determined to be present on the at least one specified section than in a second case in which deposition is determined to be not present on the at least one specified section.

7. The vehicle control system according to claim 6, wherein
the vehicle includes a display device for showing the travel route and the power-supply plan created by the processing unit.

8. The vehicle control system according to claim 6, wherein
the vehicle is capable of autonomous driving, and travels by the autonomous driving to the destination according to the travel route created by the processing unit.

* * * * *